UNITED STATES PATENT OFFICE.

LAURITZ PETERSEN-HVIID, OF COPENHAGEN, DENMARK.

METHOD OF IMPREGNATING FABRICS.

1,219,349.                    Specification of Letters Patent.    Patented Mar. 13, 1917.

No Drawing.          Application filed April 24, 1916. Serial No. 93,307.

*To all whom it may concern:*

Be it known that I, LAURITZ PETERSEN-HVIID, a subject of the King of Denmark, residing at Copenhagen, Denmark, have invented certain new and useful Improvements in Methods of Impregnating Fabrics, of which the following is a full, clear, and exact description.

It is a well known fact that solutions of gutta-percha, balata, india rubber or the like in the known solvents in concentrated state have hardly any penetrative force with regard to fibrous stuffs such as linen, woven belts, and so on.

The reason for this must be found in the fact that these solvents are of such character that by the penetration of or introduction into woven materials, they leave behind on the surface the greater part of the gutta-percha, balata or india rubber, and it is only the solvent which penetrates.

This present invention endeavors to eliminate these deficiencies by adding to the solution of gutta-percha, balata, or india rubber, sulfonated vegetable oil, for instance "Turkey red-oil."

In the present case sulfonated ricinus oil is preferred, but other sulfonated oil may be used.

An addition to the solution of gutta-percha, balata or india rubber of such oil in the proportion of from 2 to 20% has the effect of making the solution more penetrative into woven substances in each fiber, with or without the application of vacuum or pressure.

By the drying process the sulfonated oil imparts peculiar qualities to the gutta-percha, balata or india rubber of which the principal characteristic is to make these latter leathery, tough and flexible and better able to resist cold and heat.

Should it be desired to vulcanize the finished product one might simultaneously with the above mentioned solution introduce 2–10% sulfur in dissolved form into the woven material, and then submit this latter to a heating process in the well known manner.

What I claim, and desire to secure by Letters Patent, is:

1. The herein described method of impregnating fabric, consisting in mixing india rubber with a sulfonated oil, treating the fabric with this mixture and drying the same.

2. The herein described method of impregnating fabric consisting in mixing rubber with sulfonated ricinus oil adding sulfur, treating the fabric with the mixture, drying the same and finally vulcanizing.

In testimony whereof I affix my signature in presence of a witness.

LAURITZ PETERSEN-HVIID.

Witness:
  I. KNUDSEN.